Feb. 2, 1932.  G. W. PIERCE  1,843,299
MOTOR GENERATOR SET
Filed April 23, 1928
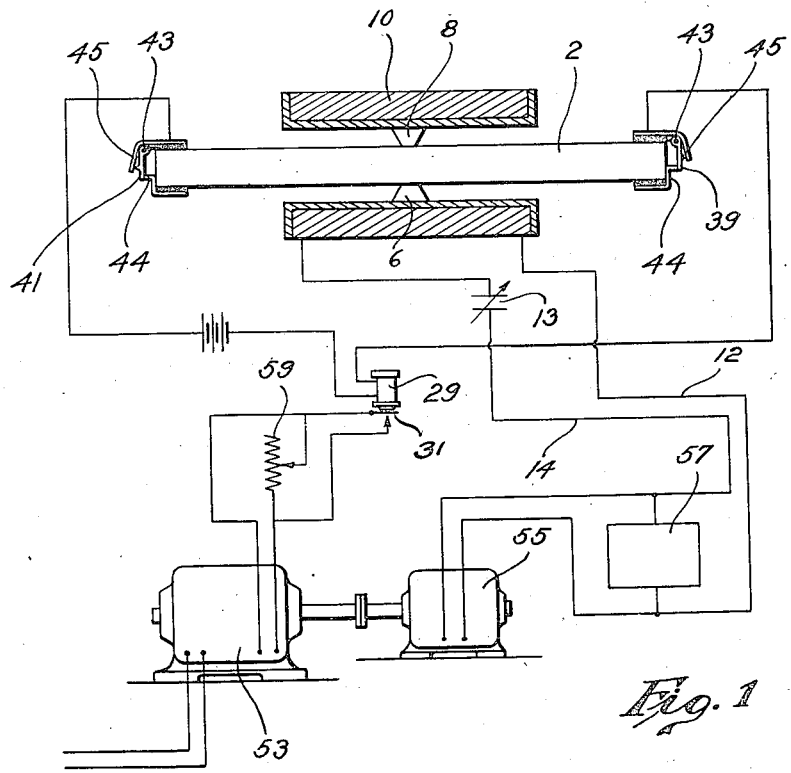
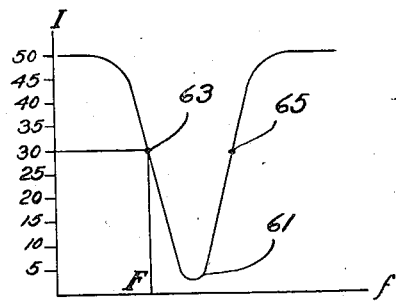
Fig. 2
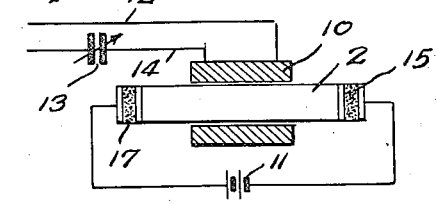
Fig. 3.
Inventor
George W. Pierce
By Davis Rines
Attorney Patented Feb. 2, 1932

1,843,299

UNITED STATES PATENT OFFICE

GEORGE W. PIERCE, OF CAMBRIDGE, MASSACHUSETTS

MOTOR-GENERATOR SET

Original application filed June 28, 1927, Serial No. 202,086, and in Canada December 31, 1927. Divided and this application filed April 23, 1928. Serial No. 272,031.

The present invention, besides having other fields of usefulness, relates more particularly to the control of motor-generator sets.

The invention will be explained in connection with the accompanying drawings, in which Fig. 1 is a diagrammatic view illustrating a preferred embodiment of the invention, Fig. 2 is a plot illustrating a principle of the invention; and Fig. 3 is a view of a modification.

A magnetostrictive core 2 is shown axially positioned within an inductive and resistive field coil 10. It is unnecessary to describe the best form that this core may take, as a full description may be found in application Serial No. 202,086, filed June 28, 1927, of which the present application is a division. The core 2 may freely rest centrally upon a support 6, but is shown clamped between the support 6 and a second clamping member 8. When an electric current is passed through the coil, a magnetic field will be established that will cause mechanical distortion or deformation of the core 2 by magnetostriction. This action of the magnetic field upon the core 2 will, for brevity, be hereinafter termed "stimulation".

If the current or voltage is alternating, the electromagnetic field created thereby will also be alternating. The core 2 will, therefore, increase and decrease in length, let us say, many times a second, every variation in the current producing its stimulative effect on the core 2. The core 2 will, in consequence, freely vibrate mechanically by magnetostriction about a nodal point at its center with a period of vibration equal to the period of the alternating electromotive force. Ordinarily, these vibrations will be quite small. When the alternating frequency is close to, or substantially the same as, the natural frequency of mechanical vibration of the core 2, however, the amplitude of vibration of the core, though still small, becomes relatively quite large. The rod will then react inductively on the load to render its consumption of power critical as to frequency for frequencies near the free frequency of the rod. The mechanical damping of the rod, mounted as shown, is as small as possible, with the result that the resonant response of the rod is very sharp and pronounced. Of course, there will usually be more than one specific frequency of magnetization at which the rod will thus resonate; for, in addition to one or more natural fundamental frequencies of mechanical vibration, it has also frequencies of vibration determined by the operation of the rod in halves, thirds, fourths, fifths, etc. The theory of this operation is explained more at length in the above-identified application, and it will be sufficient here to remember that the operation described herein is equally applicable to the fundamentals and to their overtones.

According to a feature of the present invention, the movements of the magnetostrictive device may be employed to effect the operation of a relay 31. The electric currents traversing the core-driving coil 10 produce variations of its magnetic field. The currents thus effect magnetization of the magnetostrictive core, and the latter becomes magnetostrictively deformed, and vibrates. These deformations may vary the electrical conductivity of one or more microphones 15, 17 that are attached to the core 2, as described in the said application, and illustrated in Fig. 3. In Fig. 1, however, the microphones are replaced by inertia switch armatures 39 and 41 hinged at 43 and yieldingly pressed against a contact meber 44 at the end of the core 2 by an insulated spring 45. The vibration of the core tends to drive the inertia armature out of contact with the contact member 44, and the spring 45 tends to restore the contact. As the motion of the inertia armature under the action of the spring is slow relative to the frequency of vibration of the rod, the contact is open for a large part of the time, causing a reduction in the current of the local circuit. The reversible internal stresses caused by the magnetostrictive deformations of the core may be made, therefore, to vary the current in a coil 29 of a relay 31. The coil 29 is in circuit with a local battery 11. A motor-generator set is shown with the motor at 53 and the generator at 55. The coil 10 is connected in circuit with the generator by the generator output conductors 12, 14, in parallel with the extra generator load 57. The contact members of the relay 31 are connected in shunt to the motor field-winding resistor 59.

The operation will be further understood in connection with the curve of Fig. 2, in which the local current is plotted as the ordinate against the frequency of exciting current, as the abscissa, where microphones or resistance-varying elements are associated with the magnetostrictive core. As the frequency of the exciting current in the coil 10 is increased from a low value to a value approaching the natural frequency of mechanical vibration of the core,—whether a fundamental or an overtone,—the local current through the contacting members 39, 41, or the like, decreases. For the operation of a relay, such as the relay 31, the device may be adjusted to trigger at, say, 30 milliamperes, as indicated at 63. The triggering of the relay will take place at a frequency F, as indicated in Fig. 2. The minimal point 61 of the curve represents the resonant frequency, or the natural frequency of free vibration of the core, whether a fundamental or an overtone. If desired, the relay-operating point may be chosen at the point 63, the point 61, the point 65, or elsewhere on the current-frequency curve.

In connection with a motor-generator set, it is preferable to have the operation at the point 63. Then, when the speed of the motor 53 rises to such a value as to produce at the generator terminals and in the coil 10 a frequency of the value F, the resulting deformation of the core 2 causes a decrease in the current traversing the relay coil 29, so that the relay 31 will close, causing slowing down of the motor. The generator frequency then begins to decrease, causing the relay contact to open and, consequently, speeding up the motor. The magnetostrictive core with associated apparatus thus controls the speed of the motor-generator set. The same principle of control is obviously applicable to rotary converters and similar machinery.

Modifications will readily occur to persons skilled in the art, and all such are considered to fall within the spirit and scope of the invention, as defined in the appended claims.

What is claimed is:

1. A motor-generator set having, in combination, two machines, namely, a motor and a generator, means mechanically connecting the motor and the generator together, a vibrator connected with the motor and the generator, and means whereby the vibrator is deformed mechanically when stimulated from one of the machines and causes variations in the electric circuit of the other machine when deformed mechanically.

2. A motor-generator set having, in combination, a motor and a generator mechanically connected together, and magnetostrictive means connected with the motor and the generator for controlling the speed of the motor.

3. A motor-generator set having, in combination, a motor and a generator mechanically connected together, a speed-controlling rheostat for the motor, a magnetostrictive body, an energizing coil for the body in circuit with the generator, a relay for short-circuiting the rheostat and having an energizing coil, means the electrical conduction of which varies in accordance with the magnetostrictive deformations of the body, and means connecting the last-named means, the relay coil and the body into circuit.

4. A motor-generator set having, in combination, two machines, namely a motor and a generator, means mechanically connecting the motor and the generator together, means connected with the motor and the generator for controlling the speed of the motor comprising a body adapted to be deformed mechanically when stimulated electrically and to cause an electric response when deformed mechanically, and means whereby the body is deformed mechanically when stimulated electrically from one of the machines and causes an electric response in the other machine when deformed mechanically.

5. A motor-generator set having, in combination, two machines, namely a motor and a generator, means mechanically connecting the motor and the generator together, a speed-controlling rheostat for the motor, means controlled by the generator and adapted to be deformed mechanically when stimulated electrically and to cause an electric response when deformed mechanically for short-circuiting the rheostat, and means whereby the first-named means is deformed mechanically when stimulated electrically from one of the machines and causes an electric response in the other machine when deformed mechanically.

6. An electric system having, in combination, a vibrator comprising a body, means for exciting the body by reversible internal stresses therein, an electric circuit, means for varying the electrical conduction of the circuit responsive to the vibrations of the body, a switch having an energizing coil connected in the circuit, and an electric circuit in which the switch is connected.

7. An electric system having, in combination, a magnetostrictive body, means for causing magnetostrictive deformations of the body, an electric circuit in which the body is connected, means for causing the current flowing in the circuit to vary in accordance with the magnetostrictive deformations of the body, a switch having an energizing coil connected in the circuit, and a circuit in which the switch is connected.

8. A motor-generator set having, in combination, a motor and a generator mechanically connected together, a magnetostrictive vibrator having an energizing coil connected in circuit with the generator, means for controlling the motor, and means the electrical conduction of which varies in accordance with the magnetostrictive deformations of the vibrator connected in circuit with the motor-controlling means.

9. A motor-generator set having, in combination, a motor and a generator mechanically connected together, a speed-controlling rheostat for the motor, a vibrator comprising a body, means controlled by the generator for exciting the body by reversible internal stresses therein, an electric circuit the electrical conduction of which is varied in accordance with the vibrations of the body, and a relay for short-circuiting the rheostat having an energizing coil connected in the circuit.

10. A motor-generator set having, in combination, a motor and a generator mechanically connected together, means for controlling the motor, a vibrator, means controlled by the generator for exciting the vibrator by reversible internal stresses therein, and means the electrical conduction of which is varied in accordance with the vibrations of the vibrator connected in circuit with the motor-controlling means.

In testimony whereof, I have hereunto subscribed my name.

GEORGE W. PIERCE.